(12) United States Patent
Lam et al.

(10) Patent No.: US 6,381,237 B1
(45) Date of Patent: Apr. 30, 2002

(54) TRAIL EXPLORER AND METHOD FOR EXPLORING TRAILS IN A COMMUNICATION NETWORK

(75) Inventors: Son Nguyen Lam, Nepean (CA); Nigel Robert Davis, Edgeware; Mark Uniacke, Hatfield, both of (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/183,178

(22) Filed: Oct. 30, 1998

(51) Int. Cl.[7] .................................................. H04I 12/28
(52) U.S. Cl. ........................ 370/351; 370/248; 370/255
(58) Field of Search ................................. 370/255, 351, 370/389, 248; 714/25

(56) References Cited

U.S. PATENT DOCUMENTS

| | | | |
|---|---|---|---|
| 4,893,307 A | * 1/1990 | McKay et al. | 370/389 |
| 5,384,768 A | 1/1995 | Fujii | |
| 6,046,984 A | * 4/2000 | Grodstein et al. | 370/248 |
| 6,138,249 A | * 10/2000 | Nolet | 714/25 |

FOREIGN PATENT DOCUMENTS

| | | |
|---|---|---|
| EP | 0 635 958 A2 | 1/1995 |
| GB | 2 299 729 | 10/1996 |
| WO | WO 95/34973 | 12/1995 |
| WO | WO 97/23101 | 6/1997 |

* cited by examiner

Primary Examiner—Salvatore Cangialosi
(74) Attorney, Agent, or Firm—Dennis R. Haszko

(57) ABSTRACT

A trail explorer and method for exploring trails in a communication network is described. The trail explorer is provided in a trail managing system having a trail database for storing connections in the network. The trail explorer compares the connections stored in the database and those actually provisioned in the network. When a connection exists in the network but is missing from the database, the trail explore triggers a learn process. If a connection exists in the database but is missing from the network, it marks the connection and trails using the connection as "unprovisioned" if they are not already marked so, or delete trails if they are network learned trails.

21 Claims, 9 Drawing Sheets

TRAIL EXPLORER AND METHOD FOR EXPLORING TRAILS IN A COMMUNICATION NETWORK

This invention relates to a trail explorer and method for exploring trails in a communication network.

BACKGROUND OF THE INVENTION

A communication network comprises a plurality of network elements, each of which supports various different layer networks of capability. Following International Telecommunication Union-Telecommunications standardization sector (ITU-T)recommendations G.805 and G.803, the network may be broken up into a plurality of layer networks. Each layer network comprises a set of transport functions or subnetworks which support the transfer of information of a characteristic type. Generally, a layer network is closely tied to a specific type of network transmission and/or switching technology, e.g. Synchronous Digital Hierarchy (SDH)/Synchronous Optical Network (SONET) Virtual Container 4 (VC4), Asynchronous Transfer Mode (ATM) Virtual Channel (ATM VC) or ATM Virtual Path (ATM VP).

In order to convey information between two or more termination points, a connection is provisioned between the termination points. The term "connection" is used for an abstract concept of a transport entity for conveying information, and it does not mean a physical connecting medium itself. A connection is usually composed of sub-connections, each of which can be managed independently.

Connections need to be managed to provide conveyance of information between two termination points. Conventionally, each connection is managed individually for establishing, modifying and releasing connections in response to client requests.

SUMMARY OF THE INVENTION

A communication network contains multiple physical network elements and other physical and logical resources. Each network element supports one ore more layer networks for routing signals in the supported layer networks. In this invention, an abstract representation of a network element in a single layer network is called a "subnetwork". A subnetwork encompasses resources of the network element that it represents in the layer network. In the other words, a network element may be represented by plurality of subnetworks, each of which exist in each layer network supported by the network element. Each layer network may contain one ore more subnetworks.

A trail represents connectivity between two termination points.

An object of the present invention is to provide a system and method for exploring trails in a communication network for managing the trails.

To this end, the present invention uses a trail explorer. A trail database is also provided for storing data describing connections in the network. The trail explorer compares the connections stored in the database and those actually provisioned in the network, and determines if the connections stored in the database are aligned to those actually provisioned in the network.

Connection provisioning refers to an activity that sets up connectivity between two termination points in a network. In the other words, a provisioned trail represents connectivity that is already set-up in a network between two termination points.

In accordance with an aspect of the present invention, there is provided a trail explorer for exploring trails in a communication network having a plurality of subnetworks. The trail explorer uses a database for storing connections of subnetworks; and a trail auditor for auditing the connections stored in the database in light of connections actually provisioned on the subnetworks in the network.

In accordance with another aspect of the present invention, there is provided a method for exploring trails in a communication network having a plurality of subnetworks. The method comprises the steps of storing connections for the subnetworks; and auditing the connections stored in the database in light of connections actually provisioned on the subnetworks in the network.

In accordance with another aspect of the present invention, there is provided a method for exploring trails in a communication network having a plurality of layer networks, each having one or more subnetworks. The method comprises the steps of storing in a database Sub-Network Connections (SNCs); auditing the stored SNCs by comparing the SNCs stored in the database with SNCs obtained from the network, and determining whether the SNCs stored in the database are aligned with the SNCs actually provisioned in the network.

An SNC represents connectivity within a subnetwork.

Other advantages, objects and features of the present invention will be readily apparent to those skilled in the art from a review of the following detailed description of preferred embodiments in conjunction with the accompanying drawings and claims.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
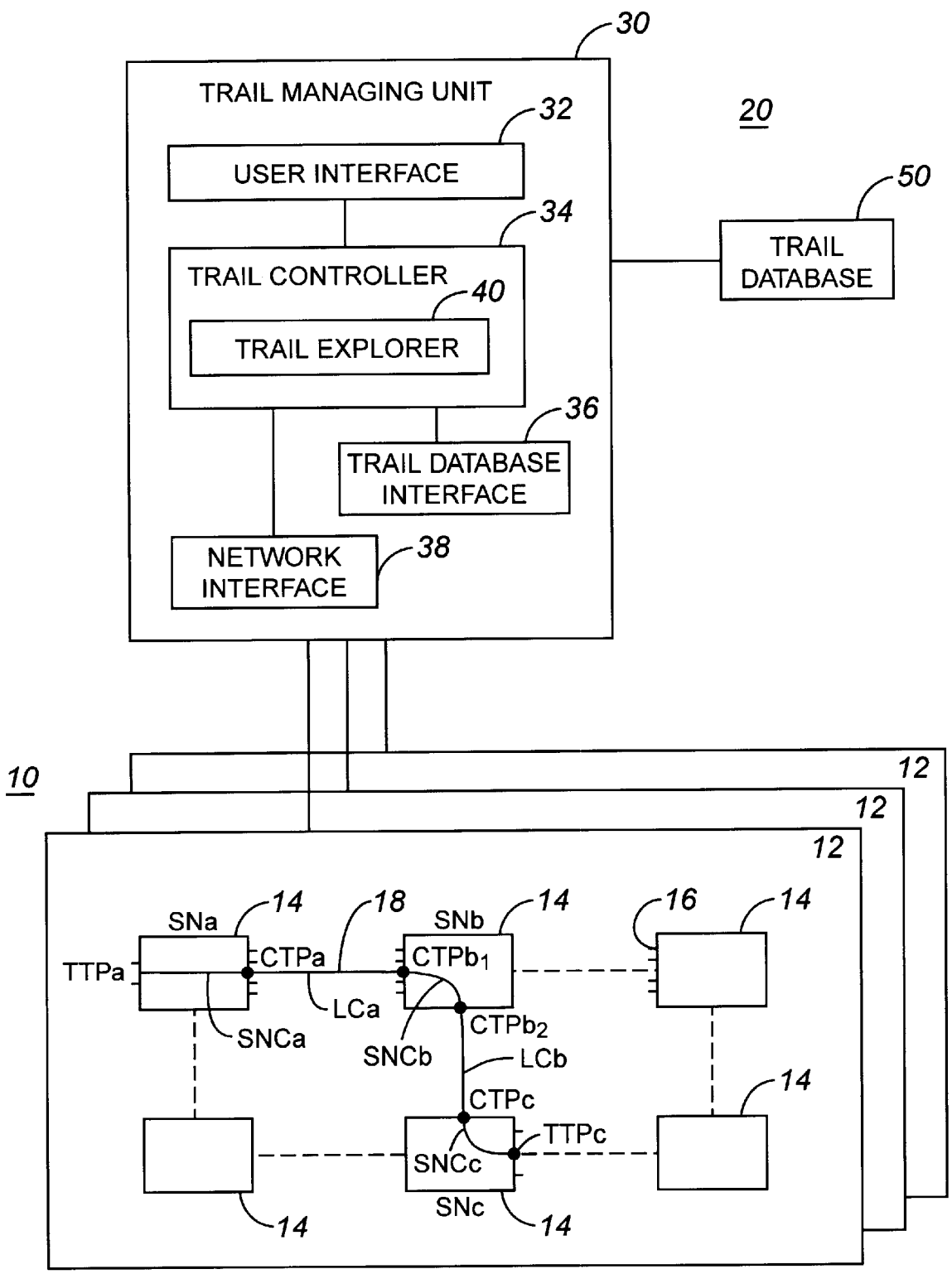
FIG. 1 is a block diagram showing an embodiment of a trail explorer in accordance with the present invention as implemented to manage connectivity in a communication network.

Referring to FIG. 1, an example of a communication network 10 to which an embodiment of a trail explorer 40 of the present invention is suitably applied.

The network 10 comprises multiple layer networks 12. Each layer network 12 comprises one or more subnetworks 14. Each subnetwork 14 represents a network element in the layer network 12.

The network elements contained in the communication network 10 may be from different manufacturers or vendors.

The invention may be applied to any communication network, such as a SONET, SDH, ATM, Pleiochronous Digital Hierarchy (PDH) or Frame Relay.

In SONET, a layer network may be, e.g. Synchronous Transport Signal level 1 (STS1), Virtual Tributary 1.5 (VT1.5), VT2 or VT2. In SDH, a layer network may be, e.g., Virtual Container 3 (VC3), VC4, VC11 or VC12. Those layer networks are only some examples, and it is not an exhausted list of layer networks.

Each subnetwork 14 has termination points 16 for provisioning connections therebetween across the subnetwork 14. A termination point of an SNC can be a Connection Termination Point (CTP) or Trail Termination Point (TTP).

Two subnetworks are connected by a link. A link may comprise multiple link connections. A link connection represents used link capacity allowing signals to transit between subnetworks. A termination point of a link is called a Link Termination Point (LTP). A single LTP may contain multiple CTPs, each of which has an indication of used capacity. In the other words, multiple CTPs may belong to the same parent LTP.

A trail spans across a layer network 12 in order to convey information between two termination points 16. A termination point of a trail is called a Trail Termination Point (TTP).

For example, in FIG. 1, a trail 18 is provisioned between a trail termination point TTPa located on a subnetwork SNa and a trail termination point TTPc located on a different subnetwork SNc. The trail 18 comprises three subnetwork connections SNCa, SNCb and SNCc. The subnetwork connection SNCa is provisioned on the subnetwork SNa containing the trail termination point TTPa and a connection termination point CTPa. Similarly, the subnetwork connection SNCb is provisioned on the subnetwork SNb containing two connection termination points $CTPb_1$ and $CTPb_2$; and the subnetwork connection SNCc is provisioned on the subnetwork SNc containing a connection termination point CTPc and the trail termination point TTPc. Between the subnetwork connections SNCa and SNCb and between the subnetwork connections SNCb and SNCc are connected by link connections LCa and LCb, respectively.

In order to manage trails, the network 10 is provided with a trail managing system 20 comprising a trail managing unit 30 and a trail database 50.

The trail managing unit 30 comprises a user interface 32, a trail controller 34, a trail database interface 36, and a network interface 38. The user interface 32 provides interface between the user and the trail managing unit 30. The trail controller 34 centrally manages the network 10 for establishing, modifying and releasing connections among the termination points 16 in response to client requests. The trail database interface 36 provides interface between the trail managing unit 30 and the trail database 50. The network interface 38 provides interface between the trail managing unit 30 and the network 10. The trail database 50 stores data describing connections among subnetworks 14. The trail managing unit 30 and the trail database 50 are typically located at a site of a service provider of the network 10.

While only one trail managing unit 30 is shown in FIG. 1, multiple trail managing units may be provided to share trail managing functions in the network 10.

Figure 2:
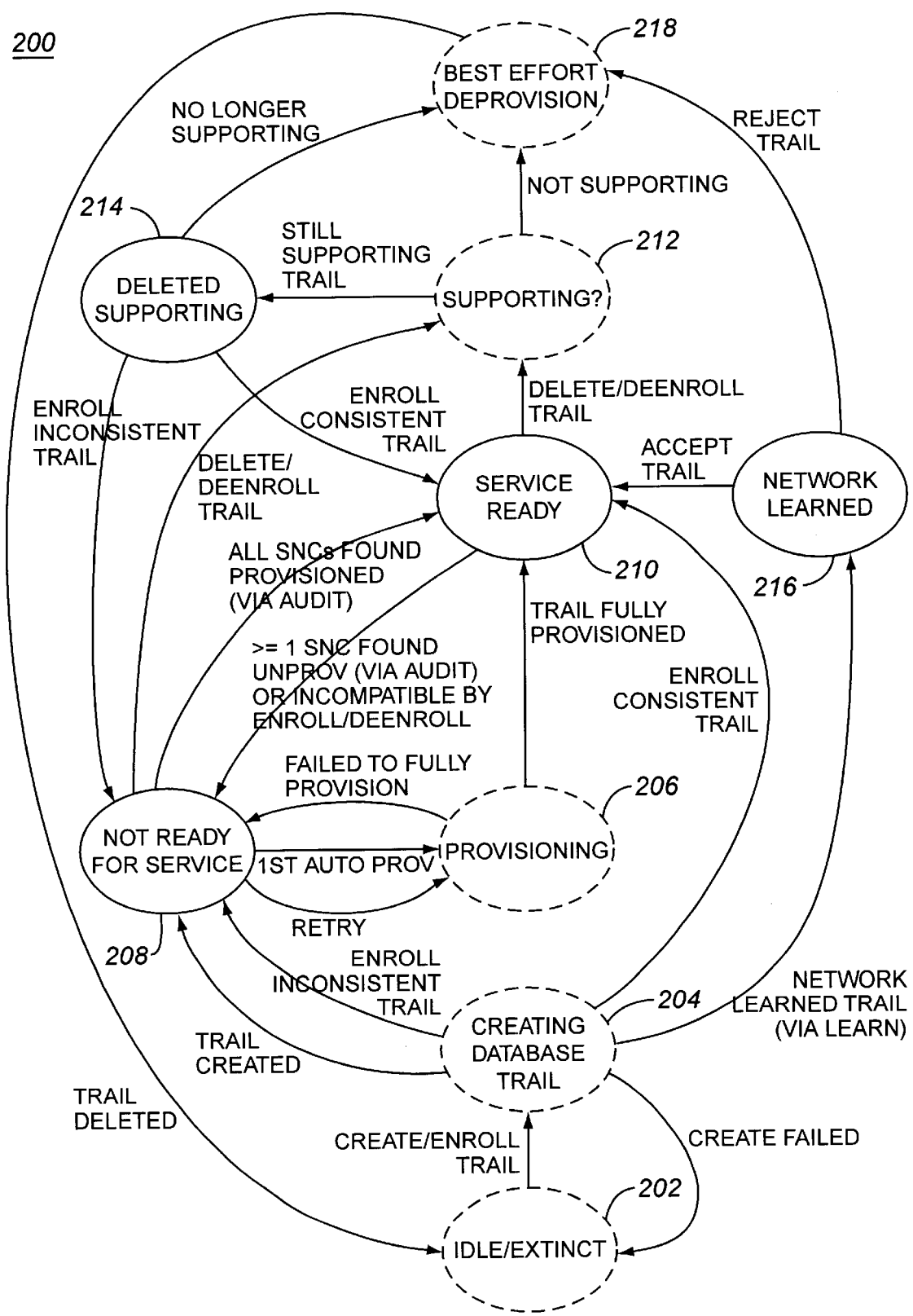
FIG. 2 is a diagram showing a suitable set of lifecycle states of a trail relevant to the present invention.

FIG. 2 shows the lifecycle states 200 of a trail. Each trail may have four stable states, i.e. "Not Ready for Service" state 208, "Service Ready" state 210, "Deleted Supporting" state 214, and "Network Learned" state 216; and five transient states, i.e. "Idle/Extinct" state 202, "Creating Database Trail" state 204, "Provisioning" state 206, "Supporting?" state 212, and "Best Effort De-provision" state 218. The transient states are not stored in the trail database 50.

The "Idle Extinct" state 202 indicates that the trail does not exist in the network 10. A trail may come into existence in the network 10 in three possible ways: enrollment of a trail from the network interface 38; trail creation invoked by the operator; and trail learned from the network 10 by the trail explorer 40.

The "Creating Database Trail" state 204 indicates a trail is being created in the trail database 50.

The "Provisioning" state 206 indicates that an already created trail created in the trail database 50 is being provisioned in the network 10. Again the trail is treated as a single entity which can either be provisioned or unprovisioned.

In this example of the lifecycle, the "Not Ready for Service" state 208 indicates that a trail has been successfully created in the trail database 50, but it has not been fully provisioned in the network 10.

The "Service Ready" state 210 is a working state which indicates that a trail has been successfully created in the trail database 50 and provisioned in the network 10.

The "Supporting?" state 212 is a state where a trail is checked whether it supports any trails in higher layers before being deleted from the trail database 50. If trails in higher layers are supported, the trail cannot be deprovisioned or deleted.

The "Deleted Supporting" state 214 indicates that a "deleted" trail cannot be deleted because it is supporting trails in higher layers. This trail can be removed from the trail database 50 when all the supported trails have been successfully deleted. A trail in this state is not explicitly removed from the network.

The "Network Learned" state 216 indicates that a trail has been found provisioned in the network, but does not currently exist in the trail database 50.

The "Best Effort De-provision" state 218 indicates that an actual trail in the network is in the process of being deleted.

The provisioning or deprovisioning action of a trail is carried out on each component of the trail where necessary, and is deemed successful if the network interface 38 returns success. Responsibility then rests with the network interface 38 to ensure that the connections are provisioned/deprovisioned from the respective subnetworks.

In this example of the lifecycle, in addition to the above lifecycle states, a trail may also have six sub-states, i.e, "Okay" sub-state, "Incomplete" sub-state, "In Conflict" sub-state, "Inconsistent" sub-state, "Unprovisioned" sub-state, and "Unknown" sub-state. All sub-states, except the "Incomplete" sub-state, can be also assigned to the component SNCs of trails.

The "Okay" sub-state indicates that the trail/SNC is fully provisioned in the network 10 and is known and consistent.

The "Incomplete" sub-state indicates that the trail is not complete. This sub-state can occur, for example, while a trail is being "learned" from the network 10, as described later.

The "In Conflict" sub-state indicates that the trail/SNC is in conflict with other trails in the trail database 50 for resources in the network 10. Each SNC which is in the "In Conflict" state references the other trails with which the trail/SNC is in conflict.

The "Inconsistent" sub-state indicates that the trail is not properly supported by the capabilities of the NEs/ports/medium composing the trail. This may mean that a lower layer network 12 is in the "Inconsistent" sub-state. An "Inconsistent" trail is by definition in "Not Ready for Service" state. Hence an "Service Ready" trail which goes inconsistent will undergo a lifecycle state transition to "Not Ready for Service" state 208. At the physical media layer, a number of conditions can occur which make a trail "Inconsistent". Examples of such conditions include a de-enrollment of a card supporting a termination point, and an enrollment of a card supporting an incompatible termination point.

The "Unprovisioned" sub-state indicates that the trail/SNC is not fully provisioned in the network 10.

The "Unknown" sub-state indicates that the trail may be in an unknown state if all or part of the trail is unknown. The "Unknown" sub-state does not cause a change in the lifecycle state.

More details of the trail lifecycle is described in a UK application No. 97260964.2 filed in 1997 by Nortel Networks, and is incorporated herein by reference.

Referring back to FIG. 1, in order to ensure the consistency of connectivity, the trail managing unit 30 needs to monitor or audit the trails actually provisioned in the network 10, and update the trail database 50. If any trail has been provisioned in the network 10 but not stored in the trail database 50, the trail managing unit 30 needs to learn the trail from the network, and store it in the trail database 50. If any trail has been deprovisioned from the network 10, the trail managing unit 30 needs to delete the trail from the trail database 50 or change the status of the trail in the trail database 50.

To this end, in accordance with the present invention, the trail managing unit 30 is provided with a trail explorer 40 in the trail controller 34.

Figure 3:
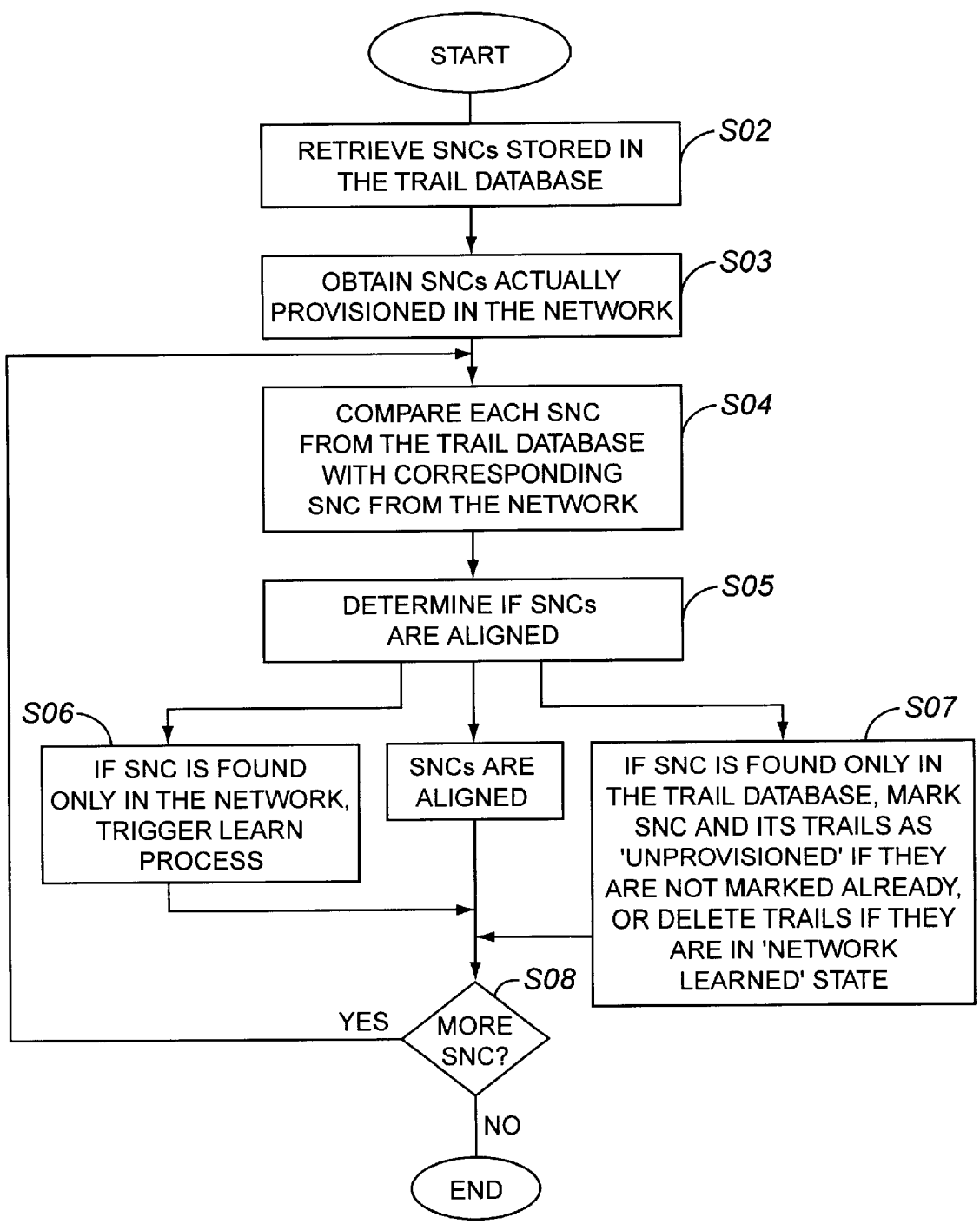
FIG. 3 is a flow chart showing an embodiment of an audit process in accordance with the present invention.

Referring to FIG. 3, the audit process by the trail explorer 40 is described. The trail explorer 40 retrieves, from the trail database 50 through the trail database interface 36, SNCs for all subnetworks to be audited in the network (S02). The trail explorer 40 also obtains, from the network 10 through the network interface 38, SNCs actually provisioned in the network 10 (S03). Then, the trail explorer 40 compares, for each subnetwork, the SNCs retrieved from the trail database 50 with the corresponding SNCs obtained from the network 10 (S04), and determines if the SNCs stored in the trail database 50 are aligned with the SNCs actually provisioned in the network 10 (S05).

If the trail explorer 40 determines that an SNC is actually provisioned in the network 10 but missing from the trail database 50, the trail explorer 40 triggers a trail learn process (S06). If the trail explorer 40 determines that an SNC is stored in the trail database 50 but it is not actually provisioned in the network 10, the trail explorer 40 marks the SNC and trails using the SNC as "unprovisioned" if they are not already in the "unprovisioned" sub-state, or remove from the trail database 50 if the trails are in "Network Learned" state (S07). Removing a trail from the trail database 50 involves removing all components making up the trail from the trail database 50 if these components are not used by other trails.

The trail explorer 40 repeats the above process until all SNCs are compared (S08).

Therefore, according to the present invention, all audit coordination and supervision activities are centralized at the network level by the trail explorer 40.

Figure 4:
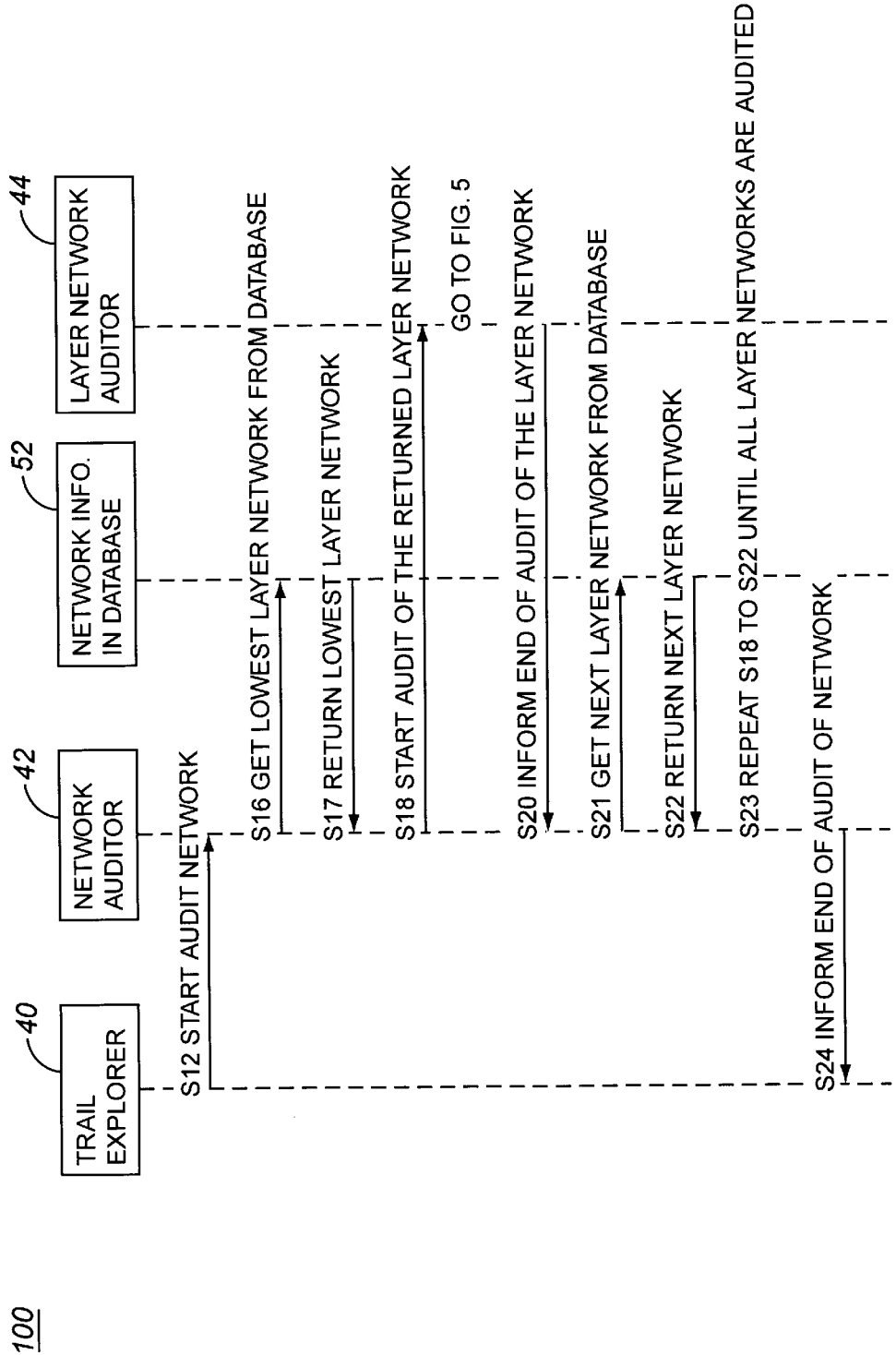
FIG. 4 is a diagram showing a part of another embodiment of an audit process in accordance with the present invention.
Figure 5:
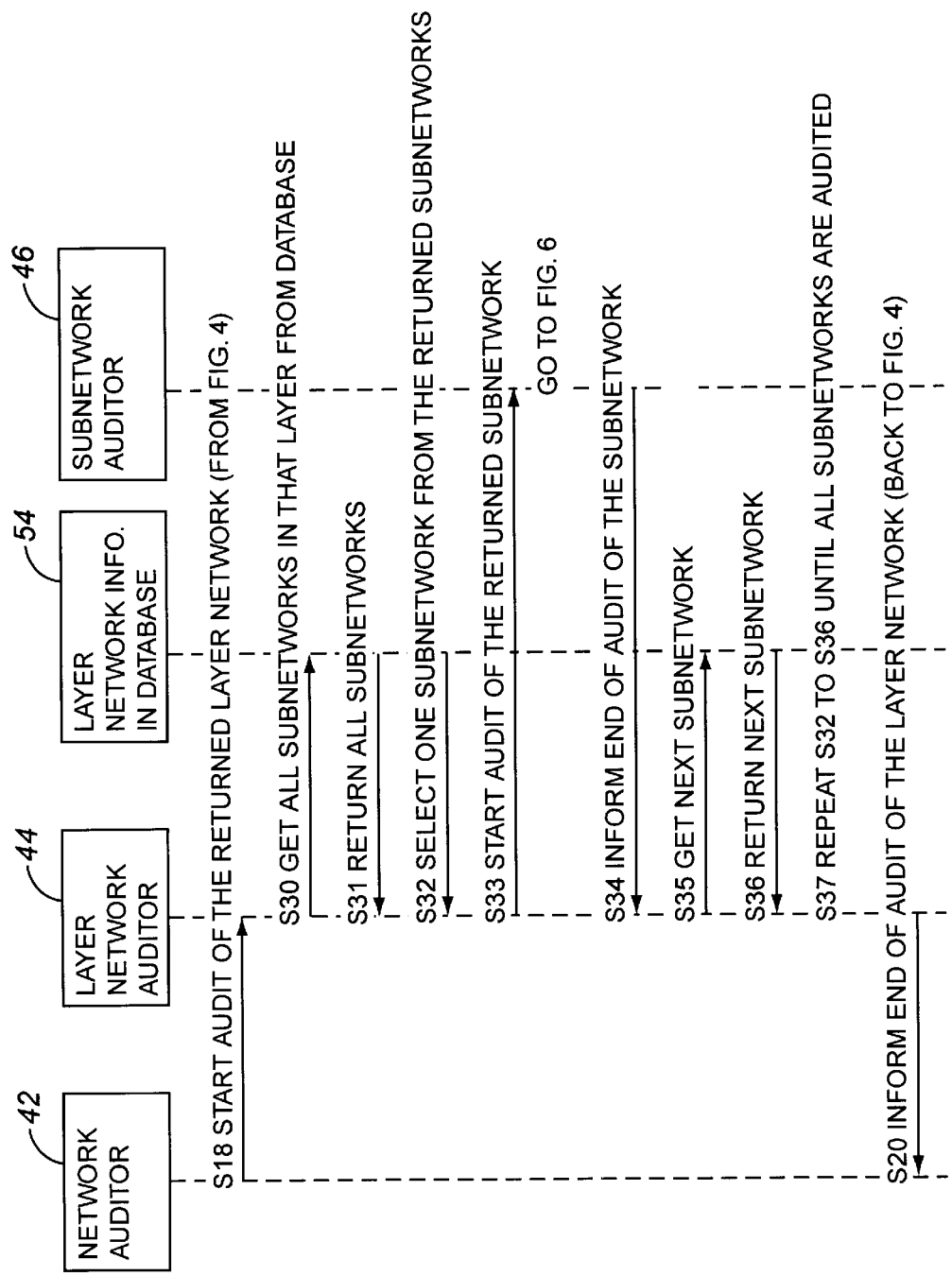
FIG. 5 is a diagram showing another part of the audit process shown in FIG. 4.
Figure 6:
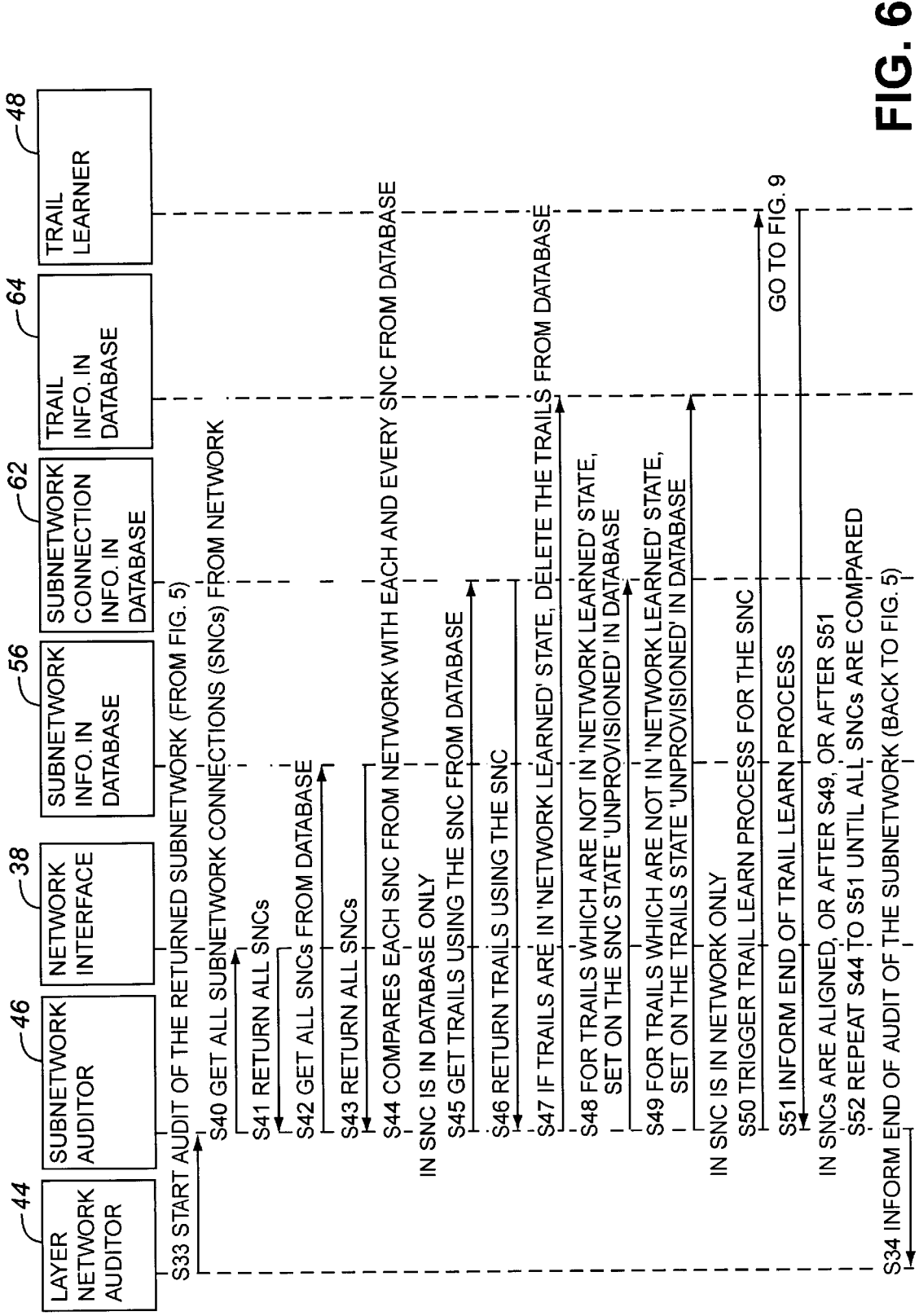
FIG. 6 is a diagram showing another part of the audit process shown in FIG. 4.

An embodiment of a use case for the audit process 100 is shown in FIGS. 4–6. The audit process 100 is broken into three interaction diagrams. The audit process 100 is suitably performed for the network 10 shown in FIG. 1.

Figure 7:
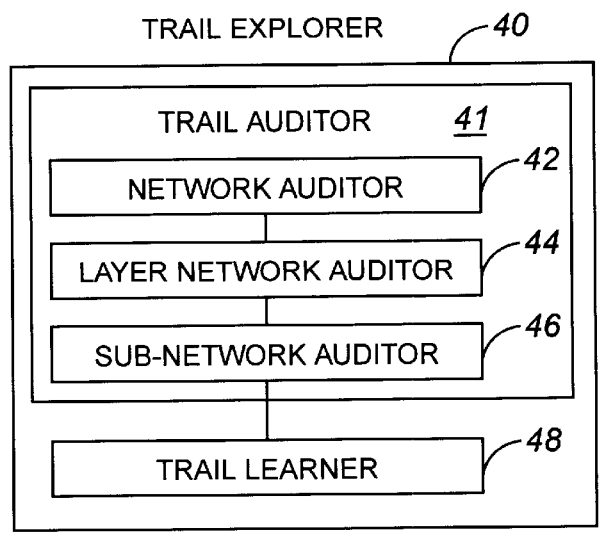
FIG. 7 is a block diagram showing an example of components making up the trail explorer shown in FIG. 1.

In order to implement the audit process 100, the trail managing unit 30 is provided with a trail auditor 41, as shown in FIG. 7. The trail auditor 41 comprises a network auditor 42, a layer network auditor 44, and a subnetwork auditor 46. The audit process 100 is controlled by the trail managing unit 30 and performed from the network auditor 42 through the layer network auditor 44 to the subnetwork auditor 46.

Figure 8:
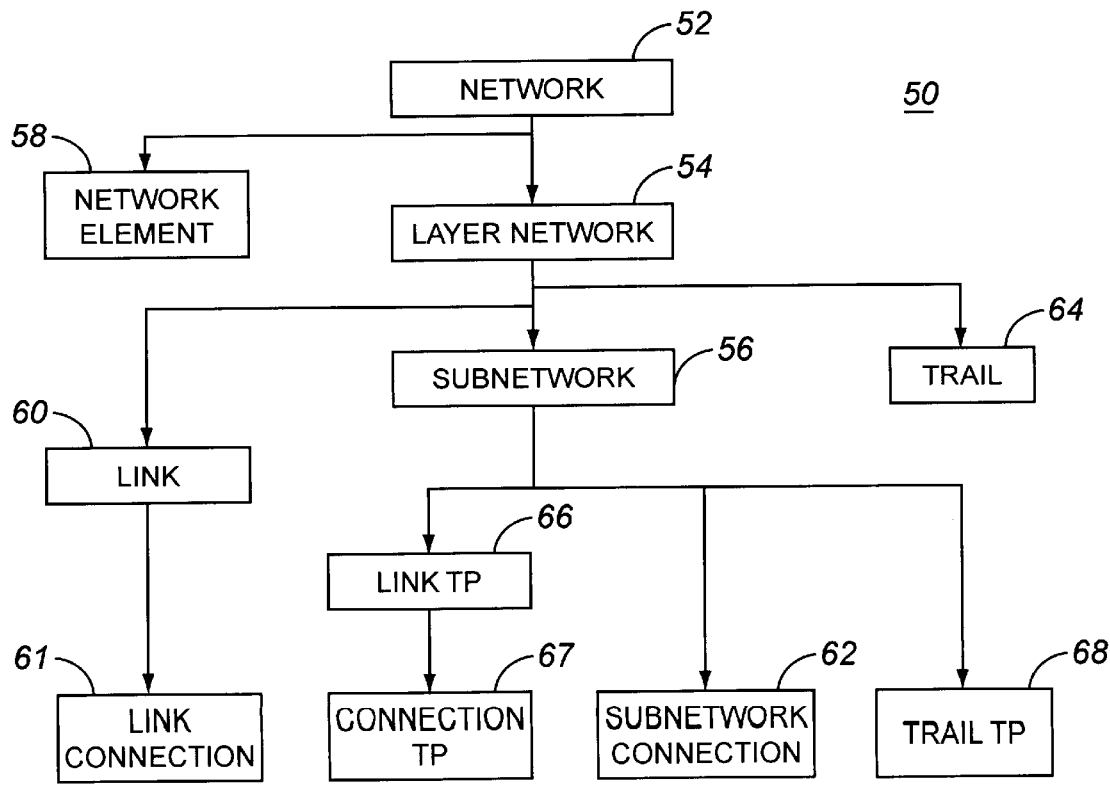
FIG. 8 is a block diagram showing an example representing a portion of the trail database shown in FIG. 1.

The trail database 50 contains information describing the network 52, layer networks 54, subnetworks 56, network elements 58, link 60, link connections 61, SNCs 62, trails 64, LTPs 66, CTPs 67 and TTPs 68. The information stored in the trail database 50 is modelled in FIG. 8. Arrows represent containment relationship. That is, the network information 52 contains the layer network information 54 and the network element information 58. The layer network information 54 contains the subnetwork information 56, the link information 60 and the trail information 64. The subnetwork information 56 contains the SNC information 62, the LTP information 66 which contains the CTP information 67, and the TTP information 68. The link information 60 contains the link connection information 61.

As shown in FIG. 4, the trail explorer 40 starts audit of the network 10 by triggering the network auditor 42 (S12). The network auditor 42 retrieves the lowest layer network from the network information 52 of the trail database 50 (S16–S17), and starts auditing of the lowest layer network of the network (S18). The auditing process of a layer network by the layer network auditor 44 is shown in FIG. 5.

When the layer network auditor 44 finishes auditing of the lowest layer network, it informs the network auditor 42 (S20). The network auditor 42 then obtains a higher layer network from the network information 52 of the trail database 50 (S21–S22), and starts audit of the next layer network by the layer network auditor 44 (S18). By repeating steps S18 to S22 (S23), the network auditor 42 goes through all the layer networks by the client/server relationship. Thus, the layer networks 12 are audited and learned in a "bottom-up" fashion.

When all layer networks in the network are audited, the network auditor 42 informs the trail explorer 40 of the end of auditing of the network (S24).

Referring now to FIG. 5, the layer network auditor 44 starts auditing of a layer network when it is triggered by the network auditor 42 (S18). The layer network auditor 44 retrieves all subnetworks from the layer network information 54 of the trail database 50 (S30–S31), and selects one subnetwork from the retrieved subnetworks (S32). It starts auditing of the first subnetwork of the layer network (S33). The auditing process of a subnetwork by the subnetwork auditor 46 is shown in FIG. 6.

When the subnetwork auditor 46 finishes auditing of the first subnetwork, it informs the layer network auditor 44 (S34). The layer network auditor 44 then obtains the next subnetwork from the layer network information 54 of the trail database 50 (S35–S36), and starts auditing of the next subnetwork (S33). By repeating steps S32 to S36 (S37), the layer network auditor 44 goes through all the subnetworks and triggers auditing on each of the subnetworks.

When all subnetworks in the layer network are audited, the layer network auditor 44 informs the network auditor 42 of the end of auditing of the layer network (S20). Then, the audit process goes to the next layer network as described above.

Referring now to FIG. 6, the subnetwork auditor 46 starts auditing of a subnetwork when it is triggered by the layer network auditor 44 (S32). The subnetwork auditor 46 obtains all SNCs actually provisioned in the network 10 through the network interface 38 (S40–S41). The subnetwork auditor 46 also retrieves all of its SNCs from the subnetwork information 56 of the trail database 50 (S42–S43) Then, it compares each SNC obtained from the network with each and every SNC retrieved from the trail database 50 (S44).

At the end of the comparison process, the subnetwork auditor may find SNCs which are aligned, SNCs which exist in the trail database 50 but are missing from the network 10, and SNCs which exist in the network 10 but are missing from the trail database 50.

For SNCs which are aligned, there is no action taken.

For each SNC which exists in the trail database 50 but is missing from the network 10, the subnetwork auditor 46 retrieves, from the subnetwork connection information 62 of the trail database 50, all trails using that SNC (S45–S46). If any of the trails retrieved are in the "network learned" state, the subnetwork auditor 46 deletes such trail(s) from the trails information 64 of the trail database 50 (S47). For the trails which are not in the "network learned" state, the subnetwork auditor 46 sets a sub-state of "unprovisioned" to the SNC and all trails using the "unprovisioned" SNC, in the trail information 64 of the trail database 50 if they are not set already (S48, S49).

For each SNC which exist in the network 10 but is missing from the trail database 50, it triggers a trail learn process (S50). The trail learn process by a trail learner 48 is described below with reference to FIG. 9. When the trail learner 48 finishes the trail learn process for the SNC, it informs the subnetwork auditor 46 (S51).

After step S49 or S51, or when the subnetwork auditor 46 determines that the SNC retrieved from the trail database 50 and the corresponding SNC obtained from the network 10 are aligned, it repeats S44 to S51 for the next SNC, and so on, until all SNCs in the subnetwork are compared (S52).

When all SNCs in the subnetwork are audited, the subnetwork auditor 46 informs the layer network auditor 44 of the end of auditing of the subnetwork (S34). Then, the audit process goes to the next subnetwork in the layer network, as described above.

The trail explorer 40 preferably keeps running the audit process one cycle after another unless it is cancelled by the network auditor 42.

It is preferable that the network auditor 42 audits the layer networks in a "bottom-up" fashion from the lowest layer network to the highest layer network.

It is preferable that the network auditor 42 attempts to audit all subnetworks at a layer network before auditing at the next higher layer network. If a subnetwork representing a network element in a lower layer network fails the audit for some reason, then the subnetworks representing that network element in higher layer networks will skip audit. The audit may fail, e.g. the trail explorer cannot read SNCs from the network interface.

It is also preferable that the network auditor 42, at the beginning of each network cycle, obtains a list of all subnetworks and prioritizes the subnetworks in the list, so that those subnetworks which were not audited in the previous cycles will have high priority. Then, the layer network auditor 44 audits for each layer network, starting from the highest prioritized subnetwork in that layer network. In order to prioritize subnetworks, the network auditor 42 may use a count for each subnetwork for recording the number of auditing to which the subnetwork has been subjected. Audit priority can be given to a subnetwork having the lowest count value. Thus, subnetworks which are probably the most out of date and likely to be misaligned may be audited and re-aligned at early opportunities. If the values of the counts are the same for two or more subnetworks, then those subnetworks may be audited in the order being retrieved from the trail database 50.

Since a network element is represented by subnetworks in different layer networks, the prioritization may be done at the network element level, and the audit priority of a network element is shared by all of the representing subnetworks. This approach results in several advantages, such as reduction in time overhead since prioritization happens once at the network element level at the beginning of an audit cycle. The trail explorer 40 does not have to prioritize subnetworks at every layer network. Also, the network auditor 42 has total control over audit operation. It takes less time to interrupt the process in case of external event such as enrollment of a subnetwork or de-enrollment of a subnetwork. The trail explorer 40 supports future evolution when the network has multiple trail managing units, and they have to load-share the audit process where each trail managing unit is responsible for auditing a subset of subnetwork list.

If subnetworks are enrolled, enrollment of a network element is generally implied here. This is because, when a network element is enrolled, subnetworks representing that network element in all supported layer networks are enrolled.

If subnetworks are enrolled during auditing, the network auditor 42 is informed of the enrollment. The network auditor 42 may interrupt the current audit, add the subnetworks to the trail database 50, and start the auditing of the newly enrolled subnetwork belonging to the lowest layer network to the subnetwork belonging to the last audited layer network. The audit process may then resume its normal operation by starting auditing of the interrupted layer network from the beginning. Thus, the trail database 50 is aligned for the newly enrolled subnetworks soon after the enrollment.

It is also preferable that the layer network auditor 44 determines if each layer network is flexible, and for the flexible layer network, further checks if each subnetwork in the layer network is flexible. A layer network is flexible if it contains at least one flexible subnetwork. A flexible subnetwork supports SNC provisioning/deprovisioning. The audit may be proceeded only for flexible layers and flexible subnetworks. Data describing flexibility of each subnetwork and layer network may be stored in the trail database 50.

As described at step S53 in FIG. 6, when an SNC is found only in the network 10 and missing from the trail database 50, the trail learn process is triggered by the subnetwork auditor 46 (S50). As shown in FIG. 7, the trail explorer 40 is provided with a trail learner 48 for this purpose. The trail learner 48 has a navigator (not shown) for navigating the trail learner 48 along a new trail using the SNC. The trail learner 48 explores connectivity that runs across the layer network 12, abstracts the connectivity into a trail, and stores the trail into the trail database 50. The trail is built by assembling SNCs that are read from subnetworks 14 in the network 10, and automatically populated into the trail database 50.

Figure 9:
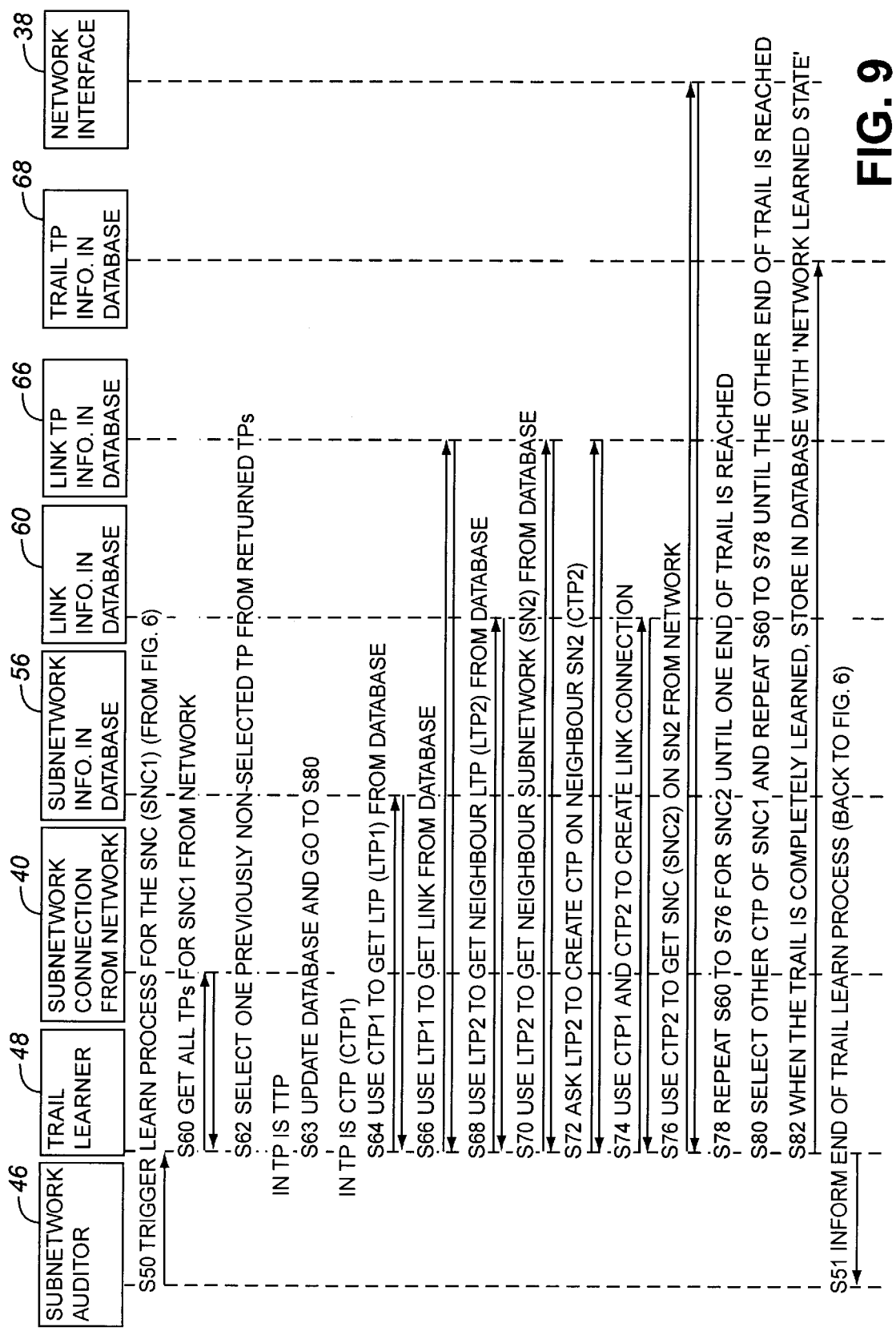
FIG. 9 is a diagram showing an embodiment of a learn process triggered by the audit process shown in FIG. 6.
Figure 10:
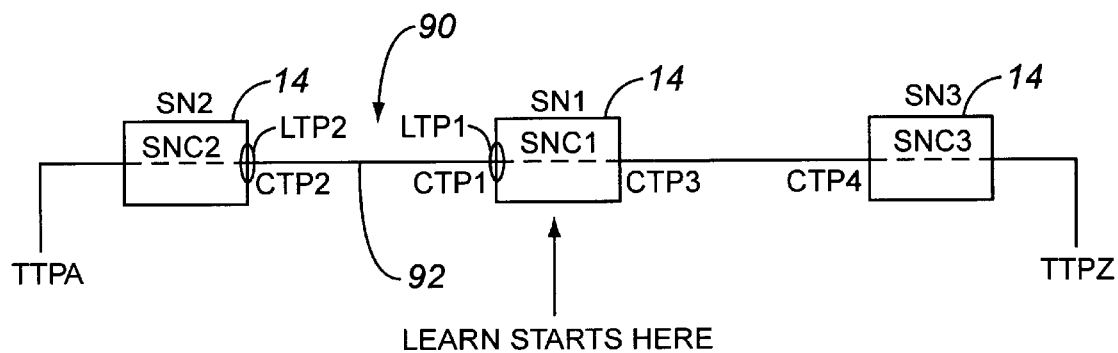
FIG. 10 is a block diagram showing an example of the learn process shown in FIG. 9.

FIG. 9 shows the trail learn process by the trail learner 48, using an example of a trail 90 shown in FIG. 10. The trail 90 is newly provisioned over a part of the network 10.

When the subnetwork auditor 46 discovers a subnetwork connection SNC1 which is actually provisioned in the network 10 but missing from the trail database 50, it triggers a trail learner 48 to start the trail learn process (S50). It creates in the trail database 50 a new persistence trail comprising the subnetwork connection SNC1. The trail learner 48 extracts all termination points for the subnetwork connection SNC1 from the network 10 and puts them in a list (S60). Then, it selects one termination point from the list (S62), and checks if the selected termination point is a trail termination point or a connection termination point.

If the selected termination point is a trail termination point, the trail learner 48 updates the trail termination point in the trail database 50 by making reference to the trail (S63). All trail termination points may be retrieved and stored in the trail database 50 when subnetworks are enrolled. In that case, the trail learner 48 retrieves the trail termination point from the trail database 50 and makes reference to the trail. Then, the process goes back to step S80.

If the selected termination point is a connection termination point, e.g. CTP1 shown in FIG. 10, the trail learner 48 retrieves its parent link termination point LTP1 from the subnetwork information 56 of the trail database 50 (S64). The CTP1 has an indication of used capacity. Using the LTP1, the trail learner 48 retrieves its link from the link termination point information 66 of the trail database 50 (S66). Using the link, it retrieves a neighbour link termination point LTP2 from the link information 60 of the trail database 50 (S68). Now using the neighbour link termination point LTP2, the trail learner 48 retrieves a neighbour subnetwork SN2 from the link termination point information 66 of the trail database 50 (S70). Then, the trail learner 48 asks the neighbour link termination point LTP2 to create a connection termination point CTP2 on the neighbour subnetwork SN2 using the same indication of used capacity indicated in the connection termination point CTP1 (S72). Finally, the trail learner 48 creates a link connection 92 based on the connection termination points CTP1 and CTP2 (S74). By the above described sub-cycle, the trail learner 48 has learned the trail 90 provisioned in the network 10 from the subnetwork connection SNC1 through the link connection 92 to the connection termination point CTP2.

To continue the learning process further along the trail 90, the trail learner 48 sends a request to the network interface 38 to retrieve a subnetwork connection SNC2 on the neighbour subnetwork SN2 based on the connection termination point CTP2 created in step S72 (S76). Using the subnetwork connection SNC2 returned by the network interface 38, the trail learner 48 repeats steps S60 to S76 for the subnetwork connection SNC2, and so on, until one end of the trail 90, TTPA, is reached (S78).

Then, the trail learner 48 selects the other connection termination point, CTP3, on the subnetwork connection SNC1, and repeats steps S60 to S78, and so on, until the other end of the trail 90, TTPZ, is reached (S80).

When the trail is completely learned, the trail learner 48 commits the trail into the database 50 with "Network Learned" state, and also commits any new SNC(s), link connection(s) and CTP(s) discovered in the network 10 into the trail database 50 (S82). Then, the trail learner 48 informs the subnetwork auditor 46 of the end of trail learn process (S51).

When each sub-cycle of steps S60 to S74 is completed, it is preferable to store in the trail database 50 the SNC, link connection, CTP learned during the sub-cycle. Thus, if the learn process is interrupted for any reason, already learned data during each successfully completed sub-cycle is not lost, and the learn process may resume from the step after the last successful sub-cycle.

After storing the learned trail 90 in the trail database 50, the trail learner 48 may present it to the user using the user interface 32 provided in the trail managing unit 30 as shown in FIG. 1. The user may then accept the learned trail 90 to update the trail database 50, or may reject the learned trail 90. When the user rejects the learned trail 90, the components of the trail which have already been stored are deleted from the trail database 50 if they are not used by other trails. When the user accepts the learned trail 90, the state of the trail 90 changes from "Network Learned" to "Service Ready".

Network-learned trails may have "Okay" sub-state indicating that it is complete, or "Incomplete" sub-state. The "Incomplete" sub-state occurs when one of the following conditions arrises: (a) any of the needed data, i.e. Link termination point, link, subnetwork, and TTP, is missing from database during the course of the learning process; (b) the network, for any reason, does not return an SNC for a given CTP; or (c) the network-learned trail contains one or more single-port SNC. A single-port SNC is an SNC that has only one termination point.

The network learned trail may have "In Conflict" state when it shares one or more network resources with an existing trail in the database. Shared network resources may be an SNC, CTP, TTP, link connection, or a combination of these resources. If "In Conflict" scenario is discovered during the trail learn process, then (a) if the existing trail has "Network Learned" state, the existing trail is deleted. Currently learned trail is, however, marked with "Okey" sub-state; (b) if the existing trail has state other than "Network Learned" state, then both trails are marked as "In conflict".

A "Network Learned" trail with "Okay" sub-state is available for services after it is accepted by the operator.

In the above embodiments, the trails 18, 90 are non-protected trails. The trail explorer of the present invention may also explore protected trails.

Figure 11:
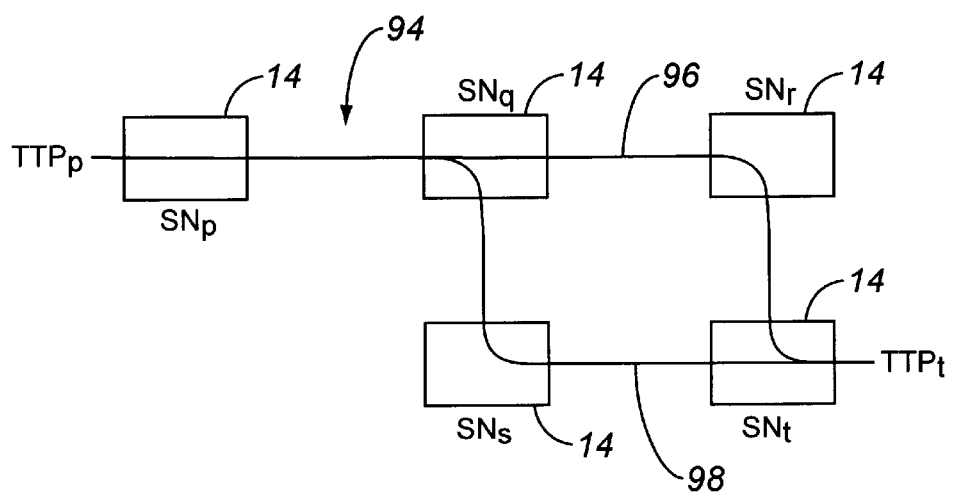
FIG. 11 is a block diagram showing an example of a protected trail.

An example of a protected trail 94 is shown in FIG. 11. The protected trail 94 runs between a trail termination point TTPp on a subnetwork SNp and a trail termination point TTPt on a subnetwork SNt. At a subnetwork SNq and a subnetwork SNt, the protected trail 94 is branched off into two paths: a protected path 96 running through a subnetwork SNr, and a protecting path 98 running through a subnetwork SNs. In this example, the trail 94 is only partially protected, but it may be fully protected by providing a full protecting path.

The trail explorer of the present invention may also explore multi-end trails. A multi-end trail is connectivity in the network usually used in applications, such as a multi-sited video conference.

The trail explorer of the present invention may also explore unidirectional broadcast trails. A unidirectional broadcast trail is unidirectional connectivity in the network usually used in applications, such as video broadcasting.

When multiple-trail manager systems are used, the trail explorers in the systems may parallely explore trails at the same time in the same layer network.

The trail explorer of the present invention may not only explore connectivity, but also explore other information of the network, such as performance monitoring attributes.

According to the present invention, connectivity in a network may be automatically explored and trails are automatically learned. Thus, the operator does not have to manually enter connectivities of each subnetwork in the network into the database, which significantly saves time and cost for managing trails in the network, especially at start-up.

While particular embodiments of the present invention have been shown and described, changes and modifications may be made to such embodiments without departing from the true scope of the invention.

For example, in the above embodiments the trail explorer is provided in the trail managing system which provisions and deprovisions trails, but it may be provided separately from the trail managing system, and have interfaces for communication with the network, trail database and users.

The present invention may be also implemented by a computer processor or similar device programmed to execute the method steps described above, or may be executed by an electronic system which is provided with means for executing these steps.

The present invention also covers a computer readable memory, such as computer diskettes, CD-ROMs, Random Access Memory (RAM) and Read Only Memory (ROM), which stores statements or instructions for use in the execution of the method steps in a computer. As well, electronic signals representing these method steps may also be transmitted via a communication network. Such electronic signals are also within the scope of the present invention.

What is claimed is:

1. A method for exploring trails in a communication network having a plurality of layer networks, each having one or more subnetworks, the method comprising the steps of:
storing in a database Sub-Network Connections (SNCs) representing connectivity in the subnetworks;
auditing the stored SNCs by comparing the SNCs stored in the database with SNCs obtained from the network; and
determining whether the SNCs stored in the database are aligned with the SNCs actually provisioned in the network.

2. The method as claimed in claim 1, wherein the step of auditing comprises the step of:
coordinating auditing of the layer networks by invoking auditing of each layer in turn;
coordinating auditing of the subnetworks in each layer network by invoking auditing of each subnetwork in turn; and
auditing each subnetwork invoked in each layer network by the steps of:
retrieving the SNCs of the subnetwork from the database;
obtaining corresponding SNCs from the network; and
comparing the SNCs from the database and the SNCs from the network.

3. The method as claimed in claim 2, wherein the step of coordinating auditing of the layer networks comprises the step of invoking auditing of the layer networks from a lowest layer in the network to a highest layer in turn.

4. The method as claimed in claim 2, wherein the step of coordinating auditing of layer networks further comprises the steps of:
obtaining a list of all subnetworks in the network from the database; and
prioritizing the subnetworks; and
the step of coordinating auditing of subnetworks invokes auditing of the subnetworks from a subnetwork having a high priority in each layer network.

5. The method as claimed in claim 2, wherein the step of coordinating auditing of layer networks further comprises the steps of;
obtaining a list of all network elements in the network from the database; and
prioritizing the network elements; and
the step of coordinating auditing of subnetworks invokes auditing of the subnetworks in each layer network from a subnetwork which represents a network element having a high priority.

6. The method as claimed in claim 2, wherein the step of coordinating auditing of subnetworks further comprises the steps of:
determining if a layer network invoked is flexible; and
proceeding with auditing of the layer network when the layer network is flexible.

7. The method as claimed in claim 2, wherein the step of coordinating auditing of subnetworks further comprises the steps of:
determining if each subnetwork in the layer network is flexible; and
proceeding with auditing of the subnetwork when the subnetwork is flexible.

8. The method as claimed in claim 1, wherein the step of auditing the SNCs further comprises the step of marking an SNC as unprovisioned in the database when the SNC is determined to be stored in the database but not actually provisioned in the network.

9. The method as claimed in claim 8, wherein the step of auditing the SNCs further comprises the step of marking trails using the SNC as unprovisioned in the database.

10. The method as claimed in claim 1 wherein the method further comprises the step of learning a new trail provisioned in the network when an SNC is determined to be actually provisioned in the network but missing from the database.

11. The method as claimed in claim 10, wherein the step of learning a new trail comprises the steps of:
following the new trail;
obtaining from the network the SNCs provisioned on the subnetwork on the new trail; and
creating the new trail in the database based on the SNCs obtained from the network.

12. The method as claimed in claim 11, wherein the step of creating the new trail comprises creating a link connection between two subnetworks based on connection termination points in the SNCs obtained from the network.

13. The method as claimed in claim 11, wherein the step of learning a new trail further comprises the step of committing the created new trail into the database.

14. A computer readable memory element storing the instructions or statements for use in the execution in a computer of a method for exploring trails in a communication network having a plurality of layer networks, each having one or more subnetworks, the method comprising the steps of:
storing connections for the subnetworks; and
auditing the connections stored in the database in light of connections actually provisioned on the subnetworks in the network.

15. The computer readable memory element as claimed in claim 14 wherein the step of auditing the connections comprises the steps of:
obtaining from the network the connections actually provisioned on the subnetworks in the network;
retrieving from the database the connections for the subnetworks stored in the database;

comparing the connections obtained from the network and connections retrieved from the database; and determining whether the connections in the database are aligned with the connections actually provisioned in the network.

16. The computer readable memory element as claimed in claim 15 further comprising a step of learning a new trail provisioned in the network when a connection is found to be actually provisioned in the network but missing from the database.

17. The computer readable memory element as claimed in claim 16, wherein the step of learning a new trail comprises the steps of:

following the new trail;

obtaining from the network the connections provisioned on the subnetworks on the new trail; and creating in the database a new connection on the subnetworks on the new trail based on the connections obtained from the network.

18. Electronic signals for use in the execution in a computer of a method for exploring trails in a communication network having a plurality of layer networks, each having one or more subnetworks, the method comprising the steps of:

storing connections for the subnetworks; and auditing the connections stored in the database in light of connections actually provisioned on the subnetworks in the network.

19. The electronic signals as claimed in claim 18 wherein the step of auditing the connections comprises the steps of:

obtaining from the network the connections actually provisioned on the subnetworks in the network;

retrieving from the database the connections for the subnetworks stored in the database;

comparing the connections obtained from the network and connections retrieved from the database; and determining whether the connections in the database are aligned with the connections actually provisioned in the network.

20. The electronic signals as claimed in claim 19 further comprising a step of learning a new trail provisioned in the network when a connection is found to be actually provisioned in the network but missing from the database.

21. The electronic signals as claimed in claim 20, wherein the step of learning a new trail comprises the steps of:

following the new trail;

obtaining from the network the connections provisioned on the subnetworks on the new trail; and creating in the database a new connection on the subnetworks on the new trail based on the connections obtained from the network.

* * * * *